May 29, 1962 V. E. YOUNG 3,037,157
REGULATOR SYSTEM
Filed Dec. 29, 1960 2 Sheets-Sheet 2
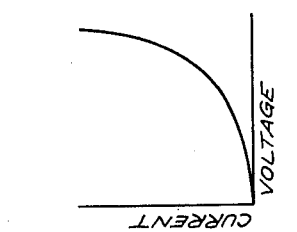
FIG. 5
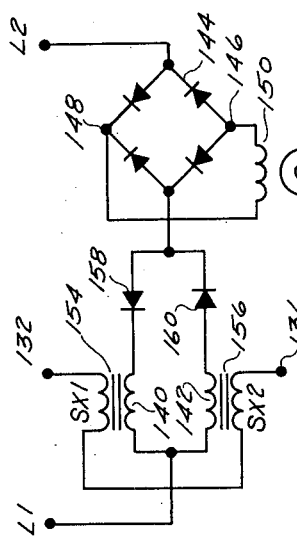
FIG. 4
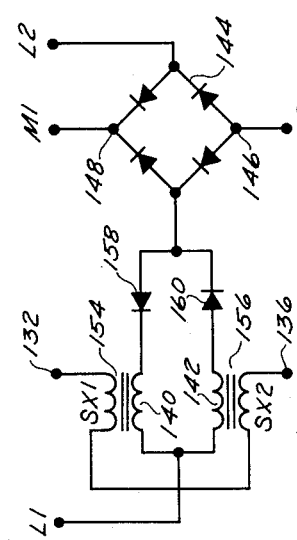
FIG. 3
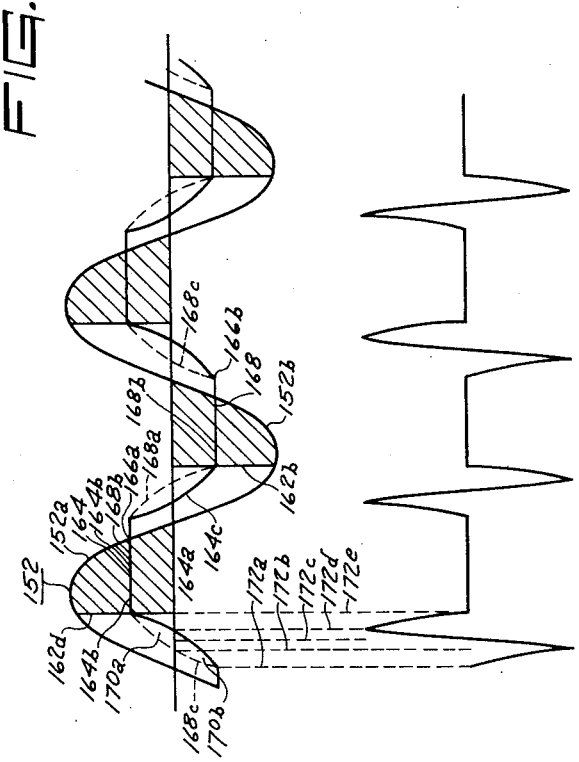
FIG. 6
FIG. 7
INVENTOR.
VICTOR E. YOUNG
BY
*William H. Schmeling*

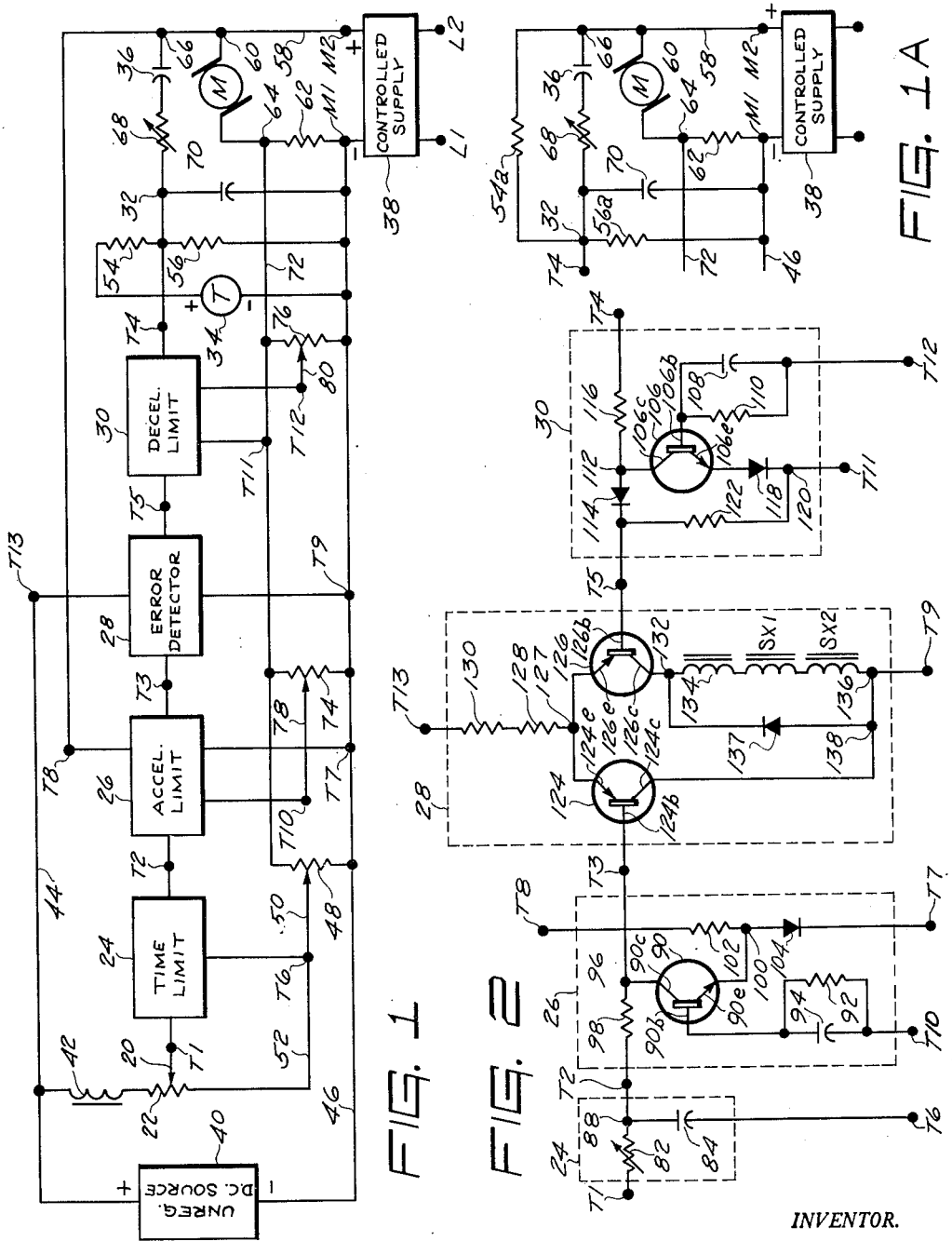

United States Patent Office 3,037,157
Patented May 29, 1962

3,037,157
REGULATOR SYSTEM
Victor E. Young, Grafton, Wis., assignor to Square D Company, Park Ridge, Ill., a corporation of Michigan
Filed Dec. 29, 1960, Ser. No. 79,280
11 Claims. (Cl. 318—308)

The present invention relates to regulator systems and is more particularly concerned with a motor regulator system employing static devices.

One of the basic components employed in the regulator system according to the present invention is a novel static error detector which compares the differences between a reference signal and a feedback signal and amplifies this difference to exercise a control funuction on the control winding of a magnetic amplifier. The error detector, because of the common bus connection with the remaining components of the system, is able to compare relatively low voltage input signals of like polarity from the reference and feedback signal sources which also have a common bus connection with the error detector. The common bus connection between the reference and feedback signal sources facilitates the combination of the error detector with other system functions, such as time rate, acceleration limit and deceleration limit circuits, which may be added to the system without modification of the basic error detector circuit. When used in the regulating system, the error detector will function at its optimum regulating capabilities regardless of added system functions which modify only the input signals to the error detector without modifying the operation of the error detector. Thus the regulator system may be formed of individual modules, each of which is selected to provide a specific function in the system and each of which limits or modifies the low voltage signals from the feedback or reference sources to the error detector without detracting from the operation of the error detector.

While the regulating system according to the present invention is particularly suited for controlling the speed of a direct current motor having a shunt field, it is suitable for use with other motors such as a wound rotor alternating current induction motor and the like. The controller, which will be hereinafter described, may be used with or without a tachometer feedback and with or without a circuit which provides an armature current and voltage feedback signal and when a shunt field type direct current motor is controlled, connection of the shunt field in series with the reference voltage source will provide certain advantages which will be later recited.

It is an object of the present invention to provide a regulating system with an error detector which compares the differences between voltages of like polarity from two different sources in the system and which is connected to both voltage sources by a common bus.

Another object of the present invention is to provide a regulating system with an error detector which compares the differences between voltage signals of like polarity from two different sources and is connected to the sources by a common bus and amplifies the difference in the voltages.

In carrying out the foregoing object, it is another object of the present invention to combine the error detector with a magnetic amplifier and to provide a means in the combination which will prevent damage to certain components of the error detector by transient voltages which are induced in the control winding of the magnetic amplifier by the gate windings of the amplifier.

It is another object of the present invention to provide a static error detector having a pair of transistors which are connected through a common bus to two different voltage signal sources wherein one of the transistors has its control electrode connected to one of the sources and the other transistor has its control electrode connected to the other source so both the control electrodes have the same polarity impressed thereon by the sources.

In carrying out the foregoing object, it is another object to connect one of the transistors in circuit with the control winding of a magnetic amplifier and to protect the said one transistor from transient voltages which are induced in the control winding.

A further object of the present invention is to provide a motor regulating system with a transistorized error detector which amplifies the differences between a reference signal which is representative of the desired motor speed and a feedback signal which is representative of the actual motor speed and to control the energization of the motor with a magnetic amplifier which has its control winding in circuit with the error detector and to provide a means in circuit with the control winding which will prevent injury to the transistors of the detector by transient voltages which are induced in the control windings by the gate windings of the magnetic amplifier.

In carrying out the above object, it is another object of the present invention to provide a novel transistorized circuit which will limit the effect of changes in the reference signal on the output of the error detector.

In carrying out the foregoing objects, it is another object of the present invention to provide a motor regulating system with a novel error detector, a novel acceleration limit circuit and a novel deceleration circuit, all of which are formed with static components and which are connected through a common bus to a reference voltage source and a feedback voltage source and with a time limit rate circuit which will delay the transmission of voltage changes in the reference voltage source through the acceleration limit circuit to the error detector but will transmit without delay any changes in the reference voltage source which are caused by an increased load on the motor to be regulated.

Another object of the present invention is to provide a motor regulating system with a novel acceleration limit circuit arrangement which will delay the transmission of changes in a reference signal to the remaining control elements of the system and will cause the remaining control elements of the system to reduce the speed of the motor when an abnormal mechanical load is impressed on the motor.

A further object of the present invention is to provide a motor regulating system with a novel deceleration limit circuit which will provide a false signal to a regulating component of the system when a reference voltage spaced control is adjusted to require the speed of the motor to be reduced at a rate greater than a predetermined rate.

These and further objects will be readily apparent to those skilled in the art from the following specification and appending drawings illustrating certain preferred embodiments in which:

FIG. 1 schematically shows a motor control circuit incorporating the features of the present invention.

FIG. 1A represents a modified form of the circuit shown in FIG. 1.

FIG. 2 diagrammatically shows a wiring diagram of the components illustrated in FIG. 1.

FIG. 3 illustrates one form of a supply circuit for the motor shown in FIG. 1 which is controlled by the components illustrated in FIG. 2.

FIG. 4 illustrates another form of the supply circuit for the motor shown in FIG. 1 which is controlled by the components shown in FIG. 2.

FIG. 5 illustrates a typical characteristic curve of the forward conduction of a diode used in the circuit shown in FIG. 2.

FIG. 6 illustrates the saturation flux curve which is induced in the magnetic amplifier cores in FIGS. 3 and 4.

FIG. 7 illustrates the voltages induced in the control windings of the magnetic amplifier by the flux shown in FIG. 7.

The motor control circuit shown in FIG. 1 of the drawings includes an adjustable reference voltage signal source provided by a slider 20 on a potentiometer resistor 22, a time limit circuit 24, an acceleration limit circuit 26, an error detector circuit 28, a deceleration limit circuit 30 and a feedback signal source which provides a voltage signal indicative of the speed of the motor M. The feedback signal comprises a composite signal of the voltage signals present at a function 32 provided by a tachometer generator 34 and a capacitor 36.

The reference voltage signal present at slider 20 is transmitted through a terminal T1 as an input signal to the time limit circuit 24. The output of the time limit circuit 24 is connected through a terminal T2 to the acceleration limit circuit 26 which has an output connected through a terminal T3 to the input of the error detector 28.

The feedback signal present at junction 32 is transmitted through a terminal T4 to the deceleration limit circuit 30 which has an output connected through a terminal T5 to an input of the error detector 28. As in conventoinal practice, the error detector 28 compares the signals at terminals T3 and T5, amplifies any difference between the signals and transmits the amplified signal to means which controls the current flow through the armature of the motor M to maintain the speed of the motor constant as determined by the setting of the slider 20 on the potentiometer 22.

The reference voltage signal present at slider 20 is provided by an unregulated direct current source indicated by numeral 40. The source 40 is preferably energized by the same alternating current source which energizes supply 38 for the motor M. Thus the reference voltage and the motor M will be subject to the same supply voltage variations. The source 40 has its positive terminal connected via lead 44 to a junction T13 and through a shunt field 42 of the motor M to one of the end terminals of resistor 22. The negative terminal of the source is connected through a lead 46 and a potentiometer resistor 48 including a slider 50 and a lead 52 to the other end terminal of the potentiometer resistor 22. Thus the shunt field 42 is connected in series with the supply for the reference voltage. This arrangement will yield several distinct advantages which are enumerated as follows: (1) an increase in resistance in the motor field as caused by an increased heating of the field will cause a decrease in the reference voltage signal and thereby a decrease in speed of the motor M; (2) an open circuit for the shunt field 42 will also reduce the reference voltage signal to zero and as will be hereinafter described, reduce the current in the armature of motor M to zero; (3) the inductive character of the shunt field 42 permits the field 42 to act as a filter for the voltage supplied by the source 40 to the reference potentiometer resistor 22.

The origin of the feedback signal present at junction 32 will now be described: the motor control system shown in FIG. 1 includes a tachometer generator 34 which is mechanically coupled to the motor M by a suitable drive, not shown. The tachometer 34 provides an output which is representative of the speed of motor A. The output terminals of the tachometer 34 are connected to supply a pair of voltage dividing resistors 54 and 56 which are interconnected at junction 32. Thus, as the speed of rotation of the motor M is varied, the potential of junction 32 will vary. The armature of motor M is supplied through a pair of motor terminals M1 and M2 from a suitable controllable direct current supply 38. The positive terminal of supply 38 is connected through terminal M2 and a lead 58 to one side of the motor armature at a junction 60. The negative terminal of supply 38 is connected through terminal M1 and a voltage dropping resistor 62 to the other side of the motor armature at a junction 64. Thus whenever the armature of motor M is energized, a voltage drop appears across resistor 62 which is proportional to the current flow in the armature of motor M. The terminal M1 is also connected to terminal M2 through a series circuit which includes junction 60, a junction 66, the capacitor 36, a potentiometer resistor 68, the junction 32 and the resistor 56. This series circuit parallels the circuit for the motor armature across terminals M1 and M2 and any change in the voltage drop across the armature of motor M will appear as a change in potential across capacitor 36. This rate of change across the capacitor 36 will be delayed by the R.C. constants of the circuit which includes the resistors 56 and 68 and may be varied to complement the characteristics of motor M by adjusting the potentiometer resistor 68. Thus the feedback signals present at junction 32 in FIG. 1 will be a composite signal which reflects both the output of the tachometer 34 and changes in voltage across the armature of motor M. The capacitor 70 connected between junctions 32 and terminal M1 filters the signal on capacitor 32.

It has been previously stated that a voltage representative of current flow through the armature of motor M appears across resistor 62 which has its respective ends connected to junction 64 and terminal M1. Also connected in parallel with the resistor 62 via a lead 72 and the lead 46 are potentiometer resistors 48, 74 and 76 having sliders 50, 78 and 80, respectively. The slider 50 is connected through a terminal T6 to the negative side of the reference voltage resistor 22. The slider 78 is connected through a terminal T10 to the acceleration limit circuit 26 and the slider 80 is connected through a terminal T12 to the deceleration limit circuit 30. The deceleration limit circuit 30 also is connected through a terminal T11 and lead 72 to junction 64. The acceleration limit circuit 26 is connected through a terminal T8 to junction 66 and through a junction T7 to lead 46. The time limit circuit 24 is connected via a terminal T6 to lead 52. As previously indicated, the error detector 28 is connected to the acceleration limit circuit 26 via terminal T3 and to the deceleration limit circuit 30 via terminal T5. The error detector 28 also is connected across the unregulated direct current supply 40 via terminals T13 and T9. The resistor 62 because of its connection in the supply circuit to the armature of motor M, is arranged so junction 64 normally has a positive polarity relative to terminal M1. Thus a voltage potential will be impressed between leads 72 and 46 which is dependent upon current flow through the armature of the motor M. This potential is impressed across the potentiometer resistors 48, 74 and 76 and a portion thereof appears at sliders 50, 78 and 80.

If desired, the tachometer 34 may be eliminated from the circuit shown in FIG. 1. This modification is shown in FIG. 1A wherein the controlled supply 38, the terminals M1, M2 and T4, as well as the motor M, the leads 46 and 72, the capacitors 36 and 70 and the resistors 62 and 68 are connected and function as described in connection with FIG. 1. In FIG. 1A, a pair of resistors 54a and 56a are connected in series between terminals M1 and M2. These resistors 54a and 56a are interconnected at junction 32. As in the embodiment described in FIG. 1, the series connected adjustable resistor 68 and capacitor 36 are connected between junction 32 and 66.

Thus, as described in connection with the circuit shown in FIG. 1, the supply 38 in regulating the speed of motor M, varies the voltage between terminals M1 and M2. This voltage change is reflected by a voltage change across the voltage dividing resistors 54a and 56a and appears as a change in the voltage signal between junction 32 and lead 72. The changed voltage signal is transmitted through terminal T4 to the deceleration limit circuit 30 as will be later described. The change in voltage at junction 32 is delayed by the capacitor 36 as was described in connection with the embodiment shown in FIG. 1.

In connection with the circuit shown in FIG. 1 and FIG. 1A, it is to be noted that the reference signal potentiometer resistor 22 is connected in series with the slider 50 of resistor 48. Thus as the current flow through the armature of motor M increases, as may be caused by an increased mechanical load on the motor, the potential at slider 50 increases relative to lead 46. When the embodiment as shown in FIG. 1A is used, the slider 50 is adjusted so that the additional potential of approximately 3 volts is added to the reference voltage signal to compensate for the internal IR voltage drop of the motor which is caused by the variations in speed of the motor due to changes in load. When the system includes a tachometer generator as shown in FIG. 1, the slider 50 is positioned so a potential equal to approximately ½ volt is added to the reference signal to compensate for the variable operation of the error detector 28 as will hereinafter be described.

The circuits shown in FIG. 2 represent in detail the components which are used in the time limit circuit 24, the acceleration limit circuit 26, the error detector 28 and the deceleration limit circuit 30 in FIG. 1 wherein the terminals T1–T13 in FIG. 2 are connected as shown in FIG. 1 to achieve the results which will be hereinafter described.

The time limit circuit 24 comprises a variable resistor 82 and a capacitor 84. One side of the capacitor 84 is connected to the terminal T6 and the other side is connected through a junction 88 and resistor 82 to the terminal T1. The junction 88 is connected to terminal T2. It is clearly apparent that the capacitor 84 will be charged to a potential determined by the setting of slider 20 of the reference signal source and that the terminal T2 will be at the same potential as the junction 88 side of capacitor 84. When the position of the slider 20 on the resistor 22 is changed to vary the speed of the motor M the transmission of the reference voltage signal at terminal T1 to terminal T2 will be delayed by a value determined by the R.C. constants of the resistor 82 and the capacitor 84. However, should the potential at terminal T1 suddenly change because the load on the motor M is varied, then the transmission of the signal to terminal T2 is not delayed because an equal change in potential will appear simultaneously at terminals T6 and T1 and thus will not appear as a change in potential across the capacitor 84.

The acceleration limit circuit 26 includes a npn type transistor 90 having an emitter 90e, a collector 90c and a base 90b electrodes. It is well known that npn transistors are nonconducting when the potential of the base is less positive than the emitter and that the transistor will conduct current from collector to the emitter when the base is positive relative to the emitter. In the acceleration limit circuit 26, the base 90b is connected through a parallel circuit consisting of a resistor 92 and a capacitor 94 to terminal T10. The resistor 92 and capacitor 94 provide an RC circuit to vary the rate of charging and discharging of capacitor 94. The collector electrode 90c is connected through a junction 96 and a resistor 98 to terminal T2 while the emitter 90e is connected to a junction 100. The junction 100 is connected through a current limiting resistor 102 to terminal T8 and through a diode 104 to terminal T7. The operation of the acceleration limit circuit will now be described. During steady state conditions, that is, when the motor M is operating at the setting dictated by the speed reference slider 20 and the load on the motor is constant, the transistor 90 is nonconducting and the potential of terminal T3 will be equal to the potential of terminal T2. Note transistor 90 is nonconducting so no current flows through resistor 98 to cause a voltage drop across the resistor 98 which would appear at terminal T3. It will be observed that the terminal T7 is connected to the lead 46 and the terminal T10 is connected to the slider 78 which is of a positive polarity relative to lead 46 due to the voltage drop across the resistor 62 which is caused by armature current flow in the motor M. This arrangement would normally cause the base 90b to be of a positive polarity relative to the emitter 90e to thereby bias the transistor 90 toward conduction. However, the circuit including the junction 66, the terminal T8, the resistor 102, the junction 100, the diode 104, the terminal T7 and lead 46 is in parallel with the circuit which includes the junction 66, the armature of the motor M, the junction 64 and the resistor 62. Thus during steady state conditions, a predetermined current will flow from junction 66 through the resistor 102 to junction 100 and thence through the diode 104 to terminal T7. It will be observed from the curve in FIG. 5 that this current flow in the diode 104 will cause a voltage drop to appear across the diode even though the diode 104 is conducting in the forward direction. This voltage drop across the diode 104 will cause the emitter 90e to have a positive polarity relative to the base 90b to thereby bias the transistor 90 against conduction.

The speed of rotation of the motor M is varied by a repositioning of the slider 20 on the potentiometer resistor 22 or by a sudden increase in mechanical load on the motor. When the slider 20 is rapidly moved upwardly to a new setting requiring an increased motor speed or if an increased mechanical load is impressed on the motor to cause a decrease in the back emf of the motor, more current flows through the motor armature circuit. This increased current causes an increased voltage drop across resistor 62 and the positive potential at terminal 10 increases, which increase is transmitted through the capacitor 99 to the base 90b. The potential at the emitter 90b remains constant and the transistor 90 conducts. Note the change in relative potential of the base 90b relative to the emitter 90e is the result of two causes. When the voltage of the motor armature circuit decreases, the flow of current from junction 66, terminal T8 and resistor 102 decreases and the voltage drop across the diode 104 decreases so the junction 100 becomes slightly less positive. Simultaneously, the increased current flow through the armature of motor M will cause the potential at terminal T10 to become more positive because of the increased voltage drop across resistor 62 as caused by the increased current through the armature of motor M. When the transistor 90 conducts, current flows from terminal T2 through the resistor 98 and junction 96 through the transistor 90 to junction 100 and diode 104 to terminal T7. The current flow through resistor 98 will cause a voltage drop to appear thereacross and the potential at terminal T3 to be less than the potential at terminal T2. Hence the magnitude of the change in the reference signal at slider 20 will be decreased by the voltage drop across resistor 98 and will appear as a reduced signal at terminal T3 during the interval transistor 90 conducts. When the motor speed equals a value dictated by the setting of the speed reference potentiometer slider 20 or the increase in load on the motor, the above described steady state conditions will be resumed after the charge across capacitor 94 is dissipated through its discharge resistor 92.

Before describing the details and operation of the error detector circuit 28, the details of the deceleration limit circuit 30 will be described.

The deceleration limit circuit 30 includes a npn type transistor 106 having a base electrode 106b, an emitter electrode 106e and a collector electrode 106c. The base electrode 106b is connected through a parallel circuit consisting of a capacitor 108 and a resistor 110 to terminal T12. The collector electrode 106c is connected through a junction 112 and a diode 114 to terminal T5 and through the junction 112 and a resistor 116 to terminal T4. The emitter 106e is connected through a diode 118 and a junction 120 to terminal T11. A resistor 122 is connected between terminal T5 and junction 120.

The operation of the deceleration limit circuit 30 will now be described. During steady state operating conditions when the speed of the motor M is equal to the speed dictated by the setting of the slider to a resistor 22, the following condition will exist. The supply 38 furnishes current to the armature of motor M causing a voltage drop across resistor 62 causing lead 72 to have a positive polarity relative to lead 46. The resistor 122 provides a circuit for the current from the error detector amplifier 28 at T5 as will be later described. This current passes from terminal T5 through the resistor 122 to terminal T11 and is blocked from flowing through the emitter to collector of transistor 106 by the diode 114. The transistor 106 is nonconducting because its base 106b is connected through terminal T12 to the slider 80 whereas its emitter 106e is connected at terminal T11 to the lead 72 which has a positive polarity relative to the slider 80.

When the slider 20 of the speed reference potentiometer resistor 22 is suddenly moved downwardly to decrease the speed and energization of the motor M, the motor acts as a direct current generator and when the embodiment as shown in FIG. 4 is used, the polarity across resistor 62 will reverse causing the slider 80 to have a temporary positive polarity relative to lead 72. When this occurs, the capacitor 108 charges to cause the base 106b to become positive relative to the emitter 106e and the transistor 106 conducts current from terminal T4 through a circuit which includes the resistor 116, junction 112, the collector to emitter of transistor 106 and the diode 118 to terminal T11. This will cause a voltage drop to appear across resistor 116, thereby lowering the positive polarity of junction T12 and the terminal T5. As will be later explained, when the speed of motor M exceeds the setting of the reference voltage signal at slider 20, the error detector 28 reduces the output of the motor armature supply 38. The reference voltage signal at terminal T3 is compared with the feedback voltage signal at terminal T5 to accomplish this result. Therefore when the deceleration limit circuit 30 causes the potential at terminal T5 to be reduced during periods of rapid deceleration of the motor M, a false feedback signal is supplied to the error detector 28 and the error detector 28 utilizes this signal to cause the motor M to be energized to prevent the motor M from decelerating too rapidly.

The capacitor 108 and its discharge resistor 110 function to delay the change of signal transmitted from terminal T12 to the base 106b and the diode 118 supplies a slight bias to the emitter 106e as was described in connection with the operation of diode 104 and the emitter 90e in the acceleration limit circuit 26.

The error detector 28 includes a pair of pnp type transistors 124 and 126 each respectively having emitter electrodes 124e and 126e, base electrodes 124b and 126b and collector electrodes 124c and 126c. The emitter electrodes 124e and 126e are interconnected at a junction 127 and connected through a pair of series connected resistors 128 and 130 to terminal T13. The base 124b is connected to terminal T3 and the base 126b is connected to terminal T5. The collector 126c is connected through a series circuit to terminal T9. This series circuit includes a junction 132, a choke coil 134, a pair of control coils SX1 and SX2 of a magnetic amplifier shown in FIGS. 3 and 4 and a junction 136. The collector 124c is connected through a junction 138 to junction 136. A diode 137 is connected between junctions 138 and 134. The importance and function of the diode 137 will be hereinafter discussed.

The slider 20 on the reference signal resistor 22 provides a reference signal voltage which is transmitted through the time limit circuit 24, the acceleration limit circuit 26 to terminal T3. This signal is proportional to the desired motor speed. The feedback voltage signal present at junction 32 is transmitted through the deceleration delay circuit 30 to terminal T5. This signal is proportional to the actual motor speed. The bases 124b and 126b are respectively connected to terminals T3 and T5.

The regulating circuitry comprising the transistors 124 and 126 is driven into conduction through resistors 128 and 130 which derive their power from the source 40 and divide the current flow from source 40, through terminal T13. The transistors 124 and 126 are of the pnp type. Thus, if the base voltage of transistors 124 from the terminal T3 is more positive than the base voltage of transistor 126 from the terminal T5, transistor 124 will begin to conduct less and transistor 126 will begin to conduct more of the available current at their common emitter point 127. The extra current flow through the transistor 126 is in a direction in the control windings SX1 and SX2 which are connected in series circuit with the main electrodes of transistor 126. This increased current will tend to increase the output of the magnetic amplifiers shown in either FIG. 3 or 4. Conversely, if the base voltage of transistor 124 is less positive than the base voltage of transistor 126, the reverse is true and transistor 124 conducts more current through a shunt circuit around the control windings SX1 and SX2, allowing transistor 126 to conduct less current to the series connected control windings SX1 and SX2 and decrease the output of the magnetic amplifier.

Note, at least one of the transistors 124 and 126 must continuously conduct and divide the current flow from source 40, for if neither conducts, then the voltage drop across resistors 128 and 130 disappears and the bases 124b and 126b, because of their connection to the terminals T3 and T5 respectively, would be less positive than the emitters 124e and 126e. The emitter to base circuit of transistor 124 is completed through a circuit which includes the terminals T13, T3, T2, T1 and the supply 40. Because of the blocking action of diode 114, the emitter to base circuit for transistor 126 is completed through a circuit which includes terminals T13, T5, the resistor 122 and terminal T11.

It was previously indicated that when the embodiment shown in FIG. 1 was employed, the potentiometer slider 50 was adjusted to compensate for variations in the error detector 28. This will now be explained in view of the following facts. The tachometer 34 provides a voltage signal at terminal T5 which is indicative of the speed of the motor M. The reference voltage slider 20 provides a voltage signal to terminal T3 which is indicative of the desired motor speed. As an increased mechanical load is imposed on the motor M, the speed of the motor M and the tachometer 34 is reduced and the voltage signal at terminal T5 is correspondingly reduced. This will cause the transistor 126 conduction to increase and the conduction of transistor 124 to decrease. An increase in conduction of transistor 126 will tend to increase the potential of terminal T5 and to decrease the potential at terminal T3 because of the respective increase and decrease in emitter to base currents of transistors 126 and 124. This will cause a decrease in the reference potential at terminal T3 and an increase in the feedback voltage signal at terminal T5. Thus the reference voltage signal and the feedback voltage signals will cease to be representative of the desired and actual motor operation and will cause the output of the error detector to be modified to reduce the motor and tachometer speeds to abnormally lower the output of the tachometer. The addition of a small voltage at the slider 50 to the reference voltage at slider 20 will change the reference voltage to compensate for increased mechanical loads on the motor. Thus as an increased load is imposed on the motor M and the speed of the motor and the tachometer is reduced, the error detector output increases so the supply 38 passes an increased current to the motor M. As was previously pointed out, the increased base to emitter current of transistor 126 causes the potential signal at terminal T3 to increase. This will cause the error detector 28 to stabilize the output of the magnetic amplifiers, which will be hereinafter described, so the speed of the motor M is less than the speed dictated by the position of slider 20. However, the increased current through the motor armature will increase the voltage drop across resistor 62 and correspondingly increase the potential at slider 50. This increased potential is added to the reference potential at slider 20 and is transmitted to terminal T3 whereby the error detector causes the conduction of transistor 126 to be increased to compensate for the effect of the increased load on the motor M.

The circuits illustrated in FIGS. 3 and 4 are conventional and either may be used as the motor armature supply controller 38 in FIG. 1 wherein the line terminals L1 and L2 and the motor terminals M1 and M2 are connected as shown in FIG. 1. The junctions 132 and 136 in FIGS. 3 and 4 are connected as shown in FIG. 2 to provide a circuit for the control windings SX1 and SX2. In FIGS. 3 and 4 the numerals 140 and 142 represent gate windings of a full wave magnetic amplifier which has its output leads connected through a bridge rectifier 144 to supply controlled direct current to the output terminals 146 and 148 of the rectifier. In FIG. 3, the terminals 146 and 148 are directly connected to the armature of motor M through terminals M1 and M2 while in FIG. 4, the terminals 146 and 148 are connected to the shunt field 150 of a generator G. Thus in FIG. 4 the output of the generator G is controlled by varying the current flow in the field 150. The output leads of the generator G are connected through terminals M1 and M2 to the armature of motor M. This will permit the deceleration limit circuit 30 to be used with the embodiment shown in FIG. 4 and not with the embodiment shown in FIG. 3, as the operation of the deceleration limit circuit 30 requires that the motor during certain intervals act as a generator.

From the above it is clearly apparent that as the current flow in control windings SX1 and SX2 is varied by the changes in conduction of transistor 126, the saturation of the iron in the magnetic amplifiers is varied and the output of the gate windings similarly will vary the direct current outputs of the bridge rectifiers to thus vary the current flow in the armature of motor M.

The diode 137 which is connected across the control windings SX1 and SX2 as shown in FIG. 2, performs an important function of protecting the transistor 126 from damage by transient voltages which are introduced by the control coils SX1 and SX2. While the origin of these transients is not completely understood, it has been observed that voltage transients of a substantial magnitude occur across the collector-base circuit of the transistor 126. When these transient voltages have a polarity to cause a current flow from the collector to the base of transistor 126, no harm results. However, when the transient voltage pulses are in the opposite direction so the collector temporarily becomes abnormally negative relative to the base of transistor 126, breakdown of the transistor results. The diode 137 during these periods is arranged to conduct the transient currents and prevent this result.

One explanation of the origin of the transient voltages which are introduced in the collector to base circuit of transistor 126 by the control coils SX1 and SX2 follows in connection with a description of the curves shown on FIGS. 6 and 7. In FIG. 6, the numeral 152 designates the sine shaped voltage wave of the alternating current from the source which is impressed across the gate windings 140 and 142 of the full wave magnetic amplifier at terminals L1 and L2, shown in FIGS. 3 and 4. The control winding SX1 and gate winding 140 are shown as magnetically coupled through one core 154 while the gate winding 142 and the control winding SX2 are magnetically coupled through another magnetic iron core 156. These windings each induce a flux in the cores with which they are respectively coupled. The cores are size so that during periods of sufficient direct current flow in the control windings SX1 and SX2 the cores 154 and 156 will saturate and thereby cause the magnetic amplifiers to "fire" when the direction of current flow in the control windings and associated gate windings coincide. In other words, during periods of saturation of the cores of a magnetic amplifier, the impedance of the gate windings rapidly changes from a high to a low value and a large abrupt increase in current flow through the gate windings occurs. The conventional magnetic amplifier circuit includes a pair of diodes 158 and 160 as shown in FIGS. 3 and 4. These diodes are arranged so that when terminal L2 has a positive polarity gate winding 140 may pass current and when terminal L1 has a positive polarity, gate winding 142 is conductive. Thus in FIG. 6 if it be assumed that during the portion of the curve 152 indicated by a numeral 152a the terminal L2 is positive and during the portion of the curve indicated by a numeral 152b, the terminal L1 is positive, then it will be seen that gate winding 140 will conduct during the half cycle portion of the curve 152a and during the succeeding half cycle shown by the curve 152b the gate winding 142 is conditioned for conduction. The gate windings and control windings both induce a magnetic flux in their respective cores. Therefore any change in current flow through the control windings causes a corresponding change in time during each half cycle at which the cores saturate and the impedance of the gate windings changes from a high to a low value. In FIG. 6 the points at which cores 154 and 156 become saturated are arbitrarily shown by the lines 162a and 162b which indicate the points at which the magnetic amplifier "fires" and the impedance of the gate windings is suddenly decreased. It will be noted that once a magnetic amplifier core is saturated, it remains saturated during the remaining half cycle during which the associated gate winding is in conductive condition. Therefore the shaded portions under the curve 152 indicate the conduction periods of the gate windings.

As was previously indicated, both the control windings and the gate windings induce a flux in the cores associated therewith. It will be observed in FIGS. 3 and 4 that the control windings SX1 and SX2 are connected in series. During the portion of the half cycle of curve 152 indicated by the numeral 152a, a flux will be induced in the core 154 by a current through winding 140 which varies according to the sine shaped voltage wave 152a. The wave shape of the induced flux change in core 154 will follow the cosine function of the sine shaped voltage wave 152a. The cosine portion of a curve 164 which is indicated by a numeral 164a. After the core 154 is saturated, the flux remains constant. This is indicated by a numeral 164b on the curve 164 which shows the changes in flux in core 154. It will be observed that at a point 166a on the curve 152a, the induced value of the flux in core 154 becomes greater than the value of the voltage which originally induced the flux in core 154. The flux does not immediately change as will be hereinafter explained. However, a short interval thereafter, the flux in the core 154 begins to decay and as it is inductively coupled to the control winding begins to induce a voltage therein. Also it is to be noted that while the change of the flux induced in the core 154 followed a portion of a cosine curve, the decay of flux will follow a logarithmic curve depending on the LR constants of the inductance and resistance of the windings of the magnetic amplifier. The logarithmic portion of the decaying flux curve is represented by a numeral 166c. Simultaneously, with the induction and decay of the flux in core 154 by the gate winding 140, the gate winding 142 will cause a similar flux change in core 156 as was described in connection with the flux change in core 154. Thus in FIG. 6 the dotted curve 168 indicates the change in the flux in core 156. The portion 168a of the curve indicates the cosine portion of the curve which shows the change in flux in the core 156 as caused when the voltage across winding 142 is increasing and the numeral 168c indicates the interval during which the voltage is decreasing and the flux in core 156 is decaying according to the logarithmic curve. It will also be observed that during the portions of the curves 166b and 168b the dotted curve 168 coincides with the solid curve 166 and hence it is represented by a solid line which indicates the flux condition of the cores during the periods of complete saturation and substantially complete desaturation of the respective cores which depends on the polarity of the terminals L1 and L2. Thus in a full wave magnetic amplifier, during each half cycle, one of the gate windings will be inducing a flux change in the core associated therewith which flux change follows the shape of a cosine curve. Simultaneously, during this period, the other core will have a decaying flux change which follows a logarithmic curve. The shapes of the cosine and logarithmic curves differ and the areas between the curves 164a and 168c as well as 164c and 168a designated by the numerals 170a and 170b which respectively represent the portions of the area above and below the axis of the sine wave 152.

It is well known that a change in flux in a core will induce a voltage in a winding which is inductively coupled to the core. Because of the difference in shape between the cosine curves and the logarithmic curves, an excess flux change is available to induce voltages in the control windings. In FIG. 7 the effect of this difference on the circuit containing the control windings SX1 and SX2 is shown wherein points 172a, b, c, d and e represent points on curves. It will be seen that at point 170a and 170e no difference in the change of flux occurs in cores 154 or 156 and hence no voltage is induced in either control winding. At point 170b and 170d the magnitudes of the differences in flux change in the respective cores will be at a maximum, and because of the transformer action provided by the winding turns of the individual control coil windings these flux changes will induce sharp voltage peaks in the control winding circuit as illustrated at points 170b and 170d in FIG. 7. At points 170c the magnitudes between the positive and negative flux changes is equal and hence no voltage is introduced in the control winding circuit. It is believed in view of the foregoing, the causes for the remaining voltage peaks as shown in FIG. 7 is self evident.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a control system for a variable speed motor wherein the speed of the motor is reflected by a feedback signal from a feedback signal source and the desired motor speed is reflected by a reference signal from a reference signal source and wherein; a supply is connected to energize the motor with a vairable current which supply includes a full wave magnetic amplifier having a pair of gate windings and at least one control winding arranged to control current flow through the gate windings and an error detector is connected to be responsive to differences in the feedback and reference signals, said error detector including; a pair of transistors each having a pair of main electrodes and a control electrode with the control electrodes of said pair of transistors respectively connected in circuit with the feedback and the reference signal sources and the main electrode of both transistors connected across a common current source for dividing current from said common source in proportion to the difference between the reference and feedback signals, circuit means connecting the control winding in series with the main electrodes of one of the transistors and a rectifier connected across the control winding in a direction to prevent transient voltages induced in the control winding from damaging the transistor connected in series therewith.

2. The combination as recited in claim 1 wherein a shunt field for the motor is connected in series circuit with the reference voltage source.

3. The combination as recited in claim 1 wherein a means connected in circuit with the supply for the motor varies the feedback signal directly with the changes in voltage across the motor.

4. The combination as recited in claim 3 wherein a means responsive to current flow in the motor is connected in the circuit between the reference signal source and the error detector for causing the motor speed to increase at a predetermined rate in response to changes in the reference signal.

5. The combination as recited in claim 3 wherein a means responsive to current flow in the motor is connected in the circuit between the feedback signal source and the error detector to limit the decrease in motor speed in response to changes in the reference signal.

6. The combination as recited in claim 1 wherein a first means responsive to armature current is connected in circuit with the supply and the motor and with the reference signal source and a second means is connected in circuit with the reference signal source and error detector and with the first means for delaying the response of the error detector to changes in the reference signal without delaying the response of the error detector to changes in armature current through the motor.

7. In a control system for a variable speed motor wherein the speed of the motor is reflected by a feedback signal from a feedback signal source and the desired motor speed is reflected by a reference signal from a reference signal source and wherein an error detector connected to be responsive to the signals from both signal sources controls a supply circuit for the motor by varying current flow to the motor in response to differences in the signals, an acceleration limiting means for limiting the rate of response of the error detector to conditions requiring an increase in current through the motor, said acceleration limiting means having an input terminal connected to the reference voltage source and an output terminal connected to the error detector and comprising; a resistor connected between the input and output terminals, an electronic device having a control electrode and a pair of main electrodes with the main electrodes connected in a series circuit including the source, the input terminal and the resistor for causing a current flow in the resistor whenever the device is conductive, means connected in circuit with the motor providing a voltage bias proportional to current flow in the motor and in circuit with the control electrode and one of the main electrodes for normally biasing the device toward a conductive state, and a means including a diode connected in circuit with the said one main electrode and in parallel circuit with the motor for biasing the device toward non-conduction in response to current flow through the diode.

8. In a control system for a variable speed motor wherein the speed of the motor is reflected by a feedback signal from a feedback signal source and the desired motor speed is reflected by a reference signal from a reference signal source, and wherein an error detector is connected to be responsive to the signals from both sources and controls a field of a direct current generator providing a supply for the motor for varying the current flow to the motor in response to differences in the signals, deceleration limiting means for limiting the deceleration in speed of the motor in response to decreased speed settings of the reference source, said deceleration limiting means having an input terminal connected to the feedback signal source and an output terminal connected to the error detector and comprising; a resistor and a diode connected in circuit between the terminals arranged for blocking current flow from the error detector through the resistor to the input terminal, an electronic device having a pair of main electrodes and a control electrode, means connected in circuit with the motor and supply providing a voltage bias proportional to current flow through the motor, said means being connected in circuit with the control electrode and one of said main electrodes for normally biasing the device toward a non conductive state when the supply is furnishing the motor with current and for biasing the device toward a conductive state when the motor is furnishing current to the supply.

9. In a control system for a variable speed motor wherein the speed of the motor is reflected by a feedback signal source and the desired motor speed is reflected by a reference signal from a reference signal source and wherein an error detector is connected to be responsive to the signals from both signal sources and controls the output of a direct current generator providing a direct current supply for the motor for varying the current flow to the motor in response to differences in the signals, a deceleration limiting means for limiting the rate of deceleration of the motor in response to a decreased speed setting of the reference signal source, said deceleration means comprising; a resistor and a diode connected in circuit between the feedback signal source and the error detector arranged to prevent current flow from the detector to the feed-back signal source, an electronic device having a pair of main electrodes connected to a junction between the diode and resistor for causing a voltage drop across the resistor when the device is rendered conductive, said device having a control electrode for controlling current flow through the main electrodes in response to a bias between the control electrode and one of the main electrodes, means connected in circuit with the supply and motor providing a voltage bias having a polarity and magnitude dependent on the direction and magnitude of the current flow between the supply and motor, said means being connected in circuit with the control electrode and said one main electrode for biasing the device toward non conduction when supply is furnishing current to the motor and for biasing the device toward conduction when the motor is furnishing the supply with current, a second diode connected in circuit with the said one electrode providing a bias for reducing the conduction of the device.

10. An error detector for comparing differences between a feedback signal source and a reference signal source and providing an output signal in response to differences in the signals to a control winding of a magnetic amplifier which has gate windings connected in circuit with a direct current load, comprising; a pair of transistors each having a pair of main electrodes and a base electrode with the base of one of the transistors connected to the reference signal source and the base of the other connected to the feedback signal source, circuit means connecting the control winding and the main electrodes of the said other transistor in a series circuit across a current source, circuit means connecting the said one transistor in a parallel circuit with the series circuit, and a diode connected across the control winding in a direction to prevent transient voltages induced in the control winding from damaging the transistor connected in said series circuit.

11. The combination as recited in claim 10 wherein the transistors are of the pnp type having their emitter electrodes connected through a common junction to the current source.

References Cited in the file of this patent
UNITED STATES PATENTS

| | | |
|---|---|---|
| 2,751,545 | Chase | June 19, 1956 |
| 2,955,244 | Montriss | Oct. 4, 1960 |
| 2,963,637 | Osborn | Dec. 6, 1960 |